United States Patent [19]
Chumbley et al.

[11] Patent Number: 5,716,687
[45] Date of Patent: Feb. 10, 1998

[54] FUSIBLE BONDING SHEET AND METHODS OF FABRICATION THEREOF

[76] Inventors: James F. Chumbley, 11804 Marine View Dr., Edmonds, Wash. 98020; Robert L. Harder, 41900 Ivy St., No. 8, Murrieta, Calif. 92562

[21] Appl. No.: 700,060

[22] Filed: Aug. 20, 1996

Related U.S. Application Data

[63] Continuation of Ser. No. 277,676, Jul. 20, 1994, abandoned.

[51] Int. Cl.$^6$ ........................ B32B 3/10
[52] U.S. Cl. ........................ 428/41.8; 428/41.9; 428/41.5; 428/343; 428/347; 428/349; 428/200; 428/201; 428/202; 428/212; 428/134; 428/135; 428/138; 428/913
[58] Field of Search ........................ 428/134, 135, 428/138, 200, 201, 202, 212, 343, 347, 349, 913, 41.9, 42.1, 41.5, 41.7, 41.8

[56] References Cited

U.S. PATENT DOCUMENTS

| | | | |
|---|---|---|---|
| 2,860,081 | 11/1958 | Eiken | 428/138 |
| 3,881,041 | 4/1975 | Glienke | 428/40 |
| 3,916,046 | 10/1975 | Youngberg | 428/31 |
| 4,880,683 | 11/1989 | Stow | 428/200 |

FOREIGN PATENT DOCUMENTS

WO 92/00187  1/1992  WIPO.

*Primary Examiner*—Marie Yamnitzky
*Attorney, Agent, or Firm*—Seed & Berry LLP

[57] ABSTRACT

A fusible adhesive sheet includes a heat-sensitive substrate having a geometrical configuration of intersecting diagonal lines with diamond-shaped voids between the lines. A lattice of pressure-sensitive adhesive is positioned on the substrate and has intersecting diagonal lines with diamond-shaped voids in between the lines in a pattern different from that for the substrate. Removable release liners are provided. In another form, the lattice work of pressure-sensitive adhesive is on a solid substrate of heat-sensitive adhesive. To make the heat-fusible sheet, the heat-sensitive adhesive is fed into the nip between a gravure roller and elastic surfaced roller. The surface of the gravure roller is provided with a series of valleys. The pressure-sensitive adhesive in liquid form is applied to the surface of the gravure roller and deposited onto the heat-sensitive adhesive and cured with heat. In another process the pressure-sensitive adhesive and the heat-sensitive adhesive substrate are separately formed on separate release liners, and thereafter joined. In another process the pressure-sensitive adhesive is applied by spraying it onto the surface of the heat-sensitive substrate.

1 Claim, 3 Drawing Sheets

FUSIBLE BONDING SHEET AND METHODS OF FABRICATION THEREOF

CROSS-REFERENCE TO RELATED APPLICATION

This application is a file wrapper contination of U.S. patent application Ser. No. 08/277,676, filed Jul. 20, 1994, now abandoned.

TECHNICAL FIELD

The invention relates to an improved heat-fusible adhesive or bonding sheet of the type used in connection with securing pieces of fabric or other sheet materials together. The improved fusible sheet includes a heat-fusible adhesive and a pressure-sensitive adhesive. The methods of manufacture of the improved heat-fusible sheet include processes involving the application of the pressure-sensitive adhesive onto a substrate of heat-sensitive adhesive and the manufacture of a sheet of pressure-sensitive adhesive.

BACKGROUND OF THE INVENTION

Heat-sensitive adhesives have been used in the past to bond sheets of fabric or other laminates together in the manufacturing of draperies, clothing and other products. The heat-sensitive adhesive is commonly placed between the sheets of fabric to be bonded and then heat is applied to the site, such as through the use of a steam iron, to melt the heat-sensitive adhesive which thereafter cools, bonding the pieces of fabric together. In this process, relative movement of the sheets of fabric and the heat-sensitive adhesive can make the process difficult or can result an unacceptable end product.

An object of the invention is to provide improved heat-fusible adhesive or bonding sheet for use in such applications which will avoid the problems created by relative movement of the work pieces and the adhesive.

A further object of the invention is to provide processes for making the improved heat-fusible adhesive sheet.

SUMMARY OF THE INVENTION

An improved fusible adhesive or bonding sheet of the type used for bonding fabrics and other materials, in one embodiment, includes a heat-sensitive substrate having a geometrical configuration consisting of intersecting diagonal lines of heat-sensitive adhesive with diamond-shaped voids between the lines. A lattice of pressure-sensitive adhesive is positioned on one or both sides of the substrate. The lattice of pressure-sensitive adhesive is formed of intersecting diagonal lines having diamond-shaped voids in between the lines on a pattern different from that for the substrate. A removable release liner is provided for the surface of the pressure-sensitive adhesive and optionally on the opposite exposed surface of the heat-sensitive substrate.

Another form of the invention includes the lattice work of pressure-sensitive adhesive on a solid substrate of heat-sensitive adhesive.

In one process of making the improved heat-fusible sheet the heat-sensitive adhesive, while supported on a release liner, is fed into the nip between a gravure roller and elastic surfaced roller. The surface of the gravure roller is provided with a series of valleys. The pressure-sensitive adhesive in liquid or emulsion form is applied to the surface of the gravure roller and deposited onto the surface of the heat-sensitive adhesive. The pressure-sensitive adhesive is thereafter cured with the application of heat. A protective releasable liner is applied over the surface of the pressure-sensitive adhesive.

In another process the pressure-sensitive adhesive and the heat-sensitive adhesive substrate are separately formed on separate release liners. The two materials thereafter are brought together between a pair of rollers bonding the pressure-sensitive adhesive to the heat-sensitive adhesive forming the final product.

In another process the pressure-sensitive adhesive is applied by spraying it onto the surface of the heat-sensitive substrate. Thereafter a release liner is applied over the surface of the pressure-sensitive adhesive.

DETAILED DESCRIPTION OF THE INVENTION

The invention relates to an improved heat-fusible sheet of the type used in connection with the assembly of draperies; clothing; and laminations for many industries utilizing textiles and/or fabrics both natural and synthetic, whether woven or nonwoven; plastics; foams or wood fiber products. Such heat-fusible sheets are also used for laminations and applying appliques on to fabrics and textiles in the home sew, arts and crafts and hobby industries. The heat-fusible sheets may be supplied in various forms such as webs, strips, tapes, die cut forms or sized and cut shapes, or the like. The heat-fusible sheets and processes for manufacturing those sheets will be described, for the purposes of illustration, in terms of a heat-fusible tape.

Figure 1:
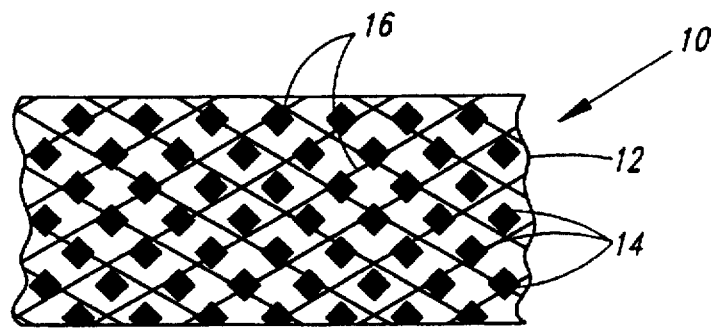
FIG. 1 is a top plan view of the preferred embodiment of the improved fusible bonding tape without release liners.
Figure 2:
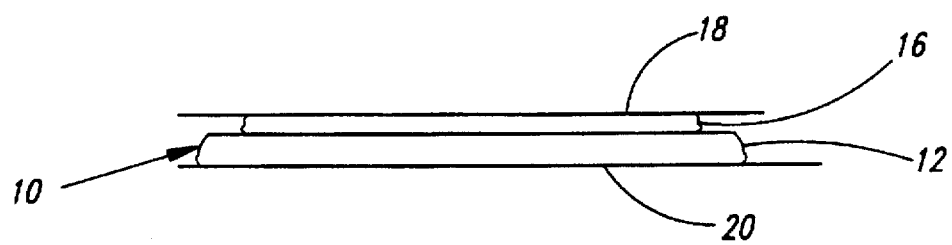
FIG. 2 is a side elevation view of a length of the preferred embodiment of the improved fusible bonding tape with protective release liners.

The heat-fusible tape, 10, is shown in its preferred embodiment in FIGS. 1 and 2. It includes, in the preferred embodiment, a heat-fusible adhesive substrate, 12, of the type disclosed in co-pending (now abandoned) U.S. patent application Ser. No. 07/540,018, filed Jun. 18, 1990, corresponding to PCT Application No. PCT/US91/04294, International Publication No. WO 92/00187, filed Jun. 18, 1991, IMPROVED FUSIBLE BONDING TAPE AND METHOD OF MANUFACTURE THEREOF, by Robert L. Harder. In its preferred embodiment, the heat-fusible adhesive substrate consists of an adhesive polymer, preferably a copolyamide polymer adhesive, preferably in the form of a lattice-like structure of intersecting diagonal lines and voids, 14, manufactured by the process disclosed in the foregoing patent document. The adhesive should be a steam or heat-sensitive adhesive which is reactivated by the presence of sufficient steam and/or continuous heat. Other heat reactivated, fusing adhesives may be utilized. The adhesive substrate is preferably made by a gravure process, as disclosed in the foregoing patent document, in which the surface of the gravure roll is prepared by means of mechanical engraving, laser engraving, or etched by chemical etching techniques. The heat-fusible substrate forms a semi-rigid base element of the improved heat-fusible tape. The substrate is the primary, final bonding agent once applied as described below.

A pressure-sensitive adhesive, 16, is applied to one or both sides of the substrate, 12. The pressure-sensitive adhesive should be selected so that it will remain tacky at least until the heat-fusible substrate has been reactivated in the course of use of the improved heat-fusible tape as described below. Preferably, pressure-sensitive adhesive, 16, is applied to the substrate in an open lattice arrangement, as shown in FIG. 1. Preferably, the pressure-sensitive adhesive is also applied by a gravure process as described below. The pattern for the lattice of pressure-sensitive adhesive is preferably geometrically different from that of the substrate. However, it may be identical, provided that the lattice formed by the heat-fusible adhesive and pressure-sensitive adhesive are not in registration. Preferably, the pattern formed by the pressure-sensitive adhesive on the heat-sensitive adhesive substrate takes the form of generally intersecting diagonal lines of adhesive forming generally diamond or polygon-shaped voids there between. The voids permit the heat-sensitive adhesive to pass there through when melted. In its preferred form the open lattice structure of the pressure-sensitive adhesive is a larger pattern than that of the substrate as shown in FIG. 1. The preferred form of the pressure-sensitive adhesive is a synthetic latex adhesive which contains 53 to 56% solids and 44 to 47% water in emulsion form.

The heat-fusible tape, 10, is preferably provided, as shown in FIG. 2, with backing material in the form of a supportive release liner. Preferably, as shown in FIG. 2, there is a release liner, 18, placed over the surface of the pressure-sensitive adhesive and a release liner, 20, over the exposed surface of the fusible adhesive. Preferably, the release liners are silicone-coated paper liners.

To use the improved fusible bonding tape, the release liner, 18, covering the pressure-sensitive adhesive is removed, and an appropriate length of the tape, selected for the particular application, is applied to one of the pieces of fabric or other substrates to be bonded. The pressure-sensitive adhesive secures the tape in position during the application process. The release liner, 20, is thereafter removed from the opposite side of the tape. Then the remaining piece of fabric or substrate to be bonded to the first is placed in its appropriate position relative to the first piece of fabric or substrate. Then heat is applied, such as through the use of a steam iron, in order to melt the heat-sensitive adhesive. The bond site is then cooled or allowed to cool so that the heat-fusible adhesive solidifies and bonds the two pieces together. The open lattice-work structure of the pressure-sensitive adhesive prevents the pressure-sensitive adhesive from significantly interfering with the bonding of the heat-sensitive adhesive to both pieces of fabric or substrates which are to be bonded together. Where desired, as indicated above, the pressure-sensitive adhesive may be applied to both surfaces of the heat-fusible substrate to prevent relative movement of the pieces of fabric or the substrates to be bonded and the improved fusible adhesive tape during the application and bonding process.

The improved heat-fusible sheet having a pressure-sensitive adhesive thereon may be made in additional, alternative forms. For example, the heat-fusible substrate may be in the form of a strip, film, solid sheet, or web of heat-sensitive thermoplastic-type materials. The heat-fusible substrate may be in the form of a wet or dry laid web, spun-bonded fibers, random interlocking fibers, woven or non-woven fibers held together with adhesives, heat bonding or heat point bonding in selected patterns.

Figure 3:
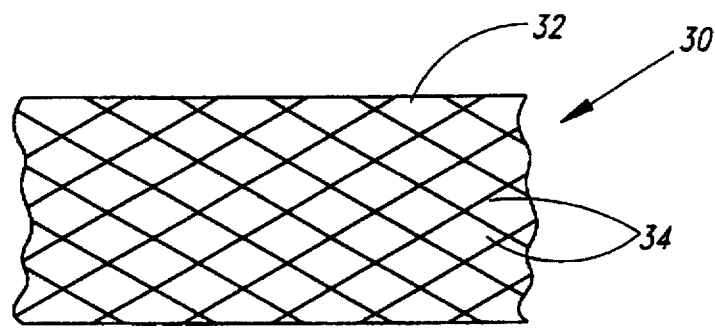
FIG. 3 is a top plan view of an alternative embodiment of the improved fusible bonding tape.

An alternative embodiment of the heat-fusible tape with a pressure-sensitive adhesive thereon is shown in FIG. 3. In this embodiment, the heat-fusible tape, 30, is formed of a strip of heat-fusible adhesive substrate, 32, without voids, on which an open lattice of pressure-sensitive adhesive, 34, is supported. The lattice forms a geometric pattern of intersecting diagonal lines of pressure-sensitive adhesive with diamond or polygon-shaped voids between the lines.

Figure 4:
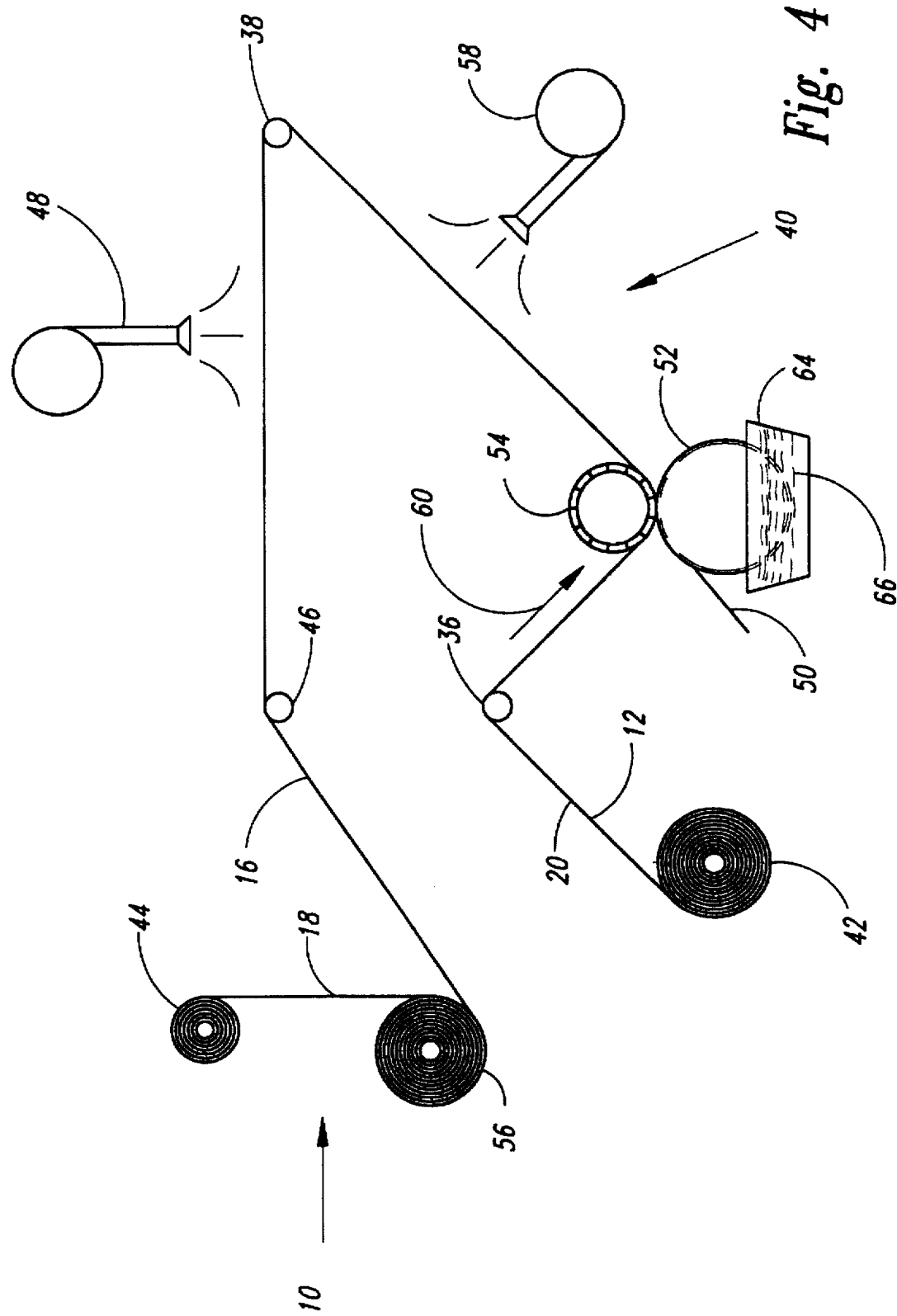
FIG. 4 is a schematic diagram showing the preferred process for manufacturing the preferred embodiment of the improved fusible bonding tape shown in FIGS. 1 and 2.

FIG. 4 illustrates the preferred method of manufacturing the preferred embodiment of the improved fusible adhesive tape shown in FIGS. 1 and 2 on apparatus 40. The apparatus consists of an idler roller, 36, a gravure roller, 52, and an associated elastic roller, 54, and doctor blade, 50. A heat source or sources, such as hot air blowers, 48 and 58, are placed in a position downstream from the gravure roller, 52, and on either side of the idler roller, 38. Downstream from the heat sources are an idler roller, 46, a release liner supply roll, 44, and a product rewind roll, 56.

Figure 5:
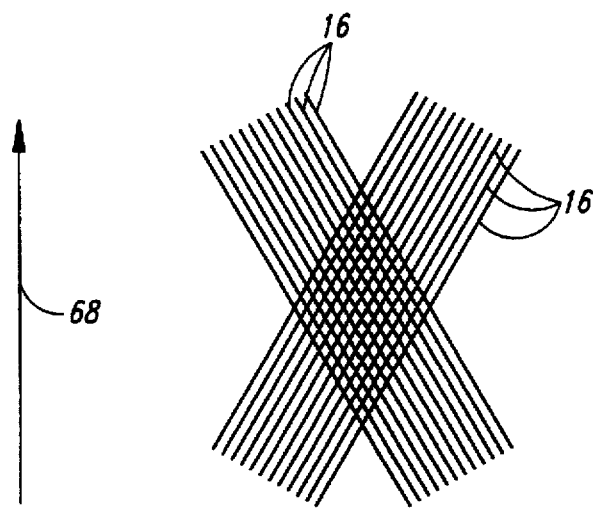
FIG. 5 is an illustration of the preferred pattern of pressure-sensitive adhesive utilized in the preferred embodiment of the improved fusible bonding tape and in the preferred method manufacturing the same shown in FIG. 4.

The gravure roller preferably has a geometric pattern of regular valleys covering the entire surface of the roller. The valleys are preferably formed of two intersecting sets of parallel valleys, which are engraved or etched onto its surface. Generally diamond or polygon shaped areas are formed between the valleys. The circumferential surface of the roller is smooth except where the surface has been engraved or etched by means of mechanical engraving, laser etching, photo-chemical etching or other process. The valleys are for holding the pressure-sensitive adhesive, and the diamond or polygon shaped areas are for forming voids. The preferred form of adhesive pattern created is shown in FIG. 5. The longitudinal direction of the adhesive web is indicated by arrow 68. This pattern is commonly referred to as a 10 quadrangle print pattern having ten lines per inch. Other line spacings and patterns may be utilized, however.

A web of heat-sensitive adhesive, 12, on a supporting release liner, 20, is fed from a supply roll, 42, over an idler roller, 36, and passes in the direction of arrow 60 through the nip of the gravure roller, 52, and an elastic-surfaced roller, 54. A reservoir, 64, retains the pressure-sensitive adhesive, 66, in fluid or emulsion form. The smooth surface of the roller surrounding the valleys is wiped clean with the doctor blade, 50, which is in constant contact with the surface of the gravure roller, across the width of the roller. The smooth surface which is wiped clean by the doctor blade creates the voids or absence of adhesive between the printed lines of the adhesive pattern. As the substrate is moved through the nip between the two rolls, the pressure-sensitive adhesive is deposited onto the substrate. The amount of pressure-sensitive adhesive applied to the surface of the heat-sensitive adhesive is controlled by the depth, width and density of the pattern etched into the surface of the gravure roller. Also controlling the amount of pressure-sensitive deposit will be the viscosity of the pressure-sensitive adhesive, the surface tension value of the fusible-substrate, and the speed or rotational velocity of the gravure roller. The substrate should enter and leave the nip between the gravure roller and the elastic roller, 54, wrapping around the elastic roller, 54, at approximately the angles shown in FIG. 4.

Thereafter, the liquid pressure-sensitive adhesive is cured, such as by subjecting it to heat from hot air blowers, 48 and 58, and/or heat lamps.

Thereafter, the release liner, 18, is fed from a supply roll, 44, onto the web to protect the tacky surface of the pressure-sensitive adhesive until it is ready for use. In the process illustrated in FIG. 4, the release liner is fed into the nip formed when the release liner, 20, substrate, 12, and pressure-sensitive adhesive, 16, are wound onto a roll, 56, of completed product.

Figure 6:
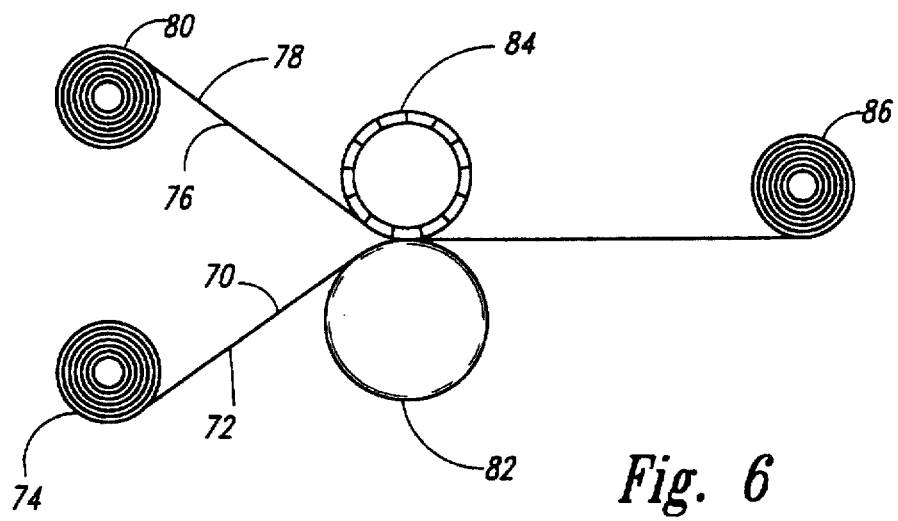
FIG. 6 is a schematic diagram showing an alternative process for manufacturing the improved fusible bonding tape.

Another method of manufacturing the improved fusible adhesive sheet is to laminate a preprinted and cured pressure-sensitive adhesive sheet or web pattern and release liner directly to one or both sides of the heat-fusible adhesive web. The preprinted and cured pressure-sensitive adhesive web preferably takes the form of a gravure pattern of adhesive that has been prepared by printing the adhesive directly onto the release paper liner and wound. This is done in a manner similar to the process illustrated in FIG. 4 and described above, but without the substrate, 12, present so that the pressure-sensitive adhesive is deposited directly on the release liner. Preferably a second release liner is not used as it is in the process of FIG. 4. However, in this case, the release paper liner in this process has differential release values on either side so that the adhesive pattern will be protected and preserved in storage and transit and also allow the printed pressure-sensitive pattern to release from the liner and adhere to the fusible adhesive web when the two substrates are brought together under nip roll pressure as shown in FIG. 6. No heat is required in this latter process. In this process, the heat-sensitive substrate, 70, on the release liner, 72, is fed from the supply roll, 74. The pressure-sensitive web, 76, on the release liner, 78, is fed from the supply roll, 80. The pressure-sensitive web and the heat-sensitive substrate are brought together under pressure such as in the nip between the chromed steel roller, 82, and elastic-surfaced roller, 84. After lamination, the substrates with release liners are rewound into a roll, 86, of completed product.

Other forms of predeposited and cured pressure-sensitive adhesive sheets may be utilized. The pressure-sensitive adhesive can be formed from hot melt thermoplastic adhesive or acrylic-type adhesive. The acrylic-type is preferred.

Figure 7:
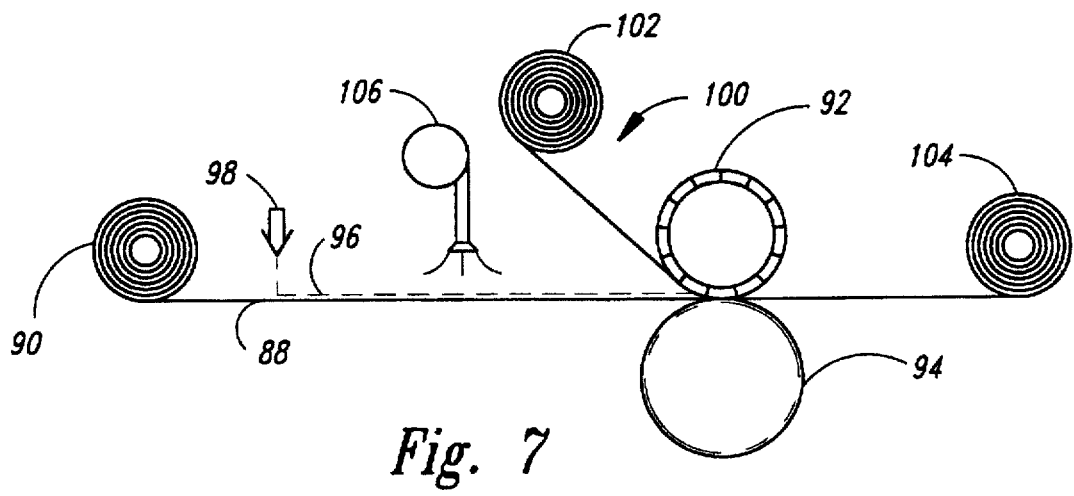
FIG. 7 is a schematic diagram illustrating yet another method of manufacturing the improved fusible bonding sheet.

An additional method of manufacturing the improved fusible adhesive sheet involves spraying the pressure-sensitive adhesive directly on to the heat-sensitive substrate. This process is shown in FIG. 7. The substrate, 88, is fed from a supply roll, 90, into the nip between the elastic-surfaced roller, 92, and the chromed steel roller, 94. Prior to entering the nip, pressure-sensitive adhesive, 96, is sprayed from a supply nozzle, 98, onto the surface of the substrate, 88. The pressure-sensitive adhesive is cured through the use of a heat source, such as hot air blower, 106. A release liner, 100, is also fed into the nip between the rollers, 92 and 94, before the completed product is wound up on roll 104.

While various embodiments have been described in this application for illustrative purposes, the claims are not limited to the embodiments described herein. Equivalent products or steps may be substituted for those described, which operate according to principles of the present invention and thus fall within the scope of the claims.

We claim:

1. An improved fusible adhesive sheet for bonding selected material portions together, comprising:

a heat-sensitive adhesive layer having first and second opposing surfaces;

a first pressure-sensitive adhesive layer on the first surface of the heat-sensitive adhesive layer;

a second pressure-sensitive adhesive layer on the second surface of the heat-sensitive adhesive layer, the first and second pressure-sensitive adhesive layers sandwiching the heat sensitive adhesive layer therebetween to form an adhesive layer set, the first and second pressure-sensitive adhesive layers being of selected geometrical configurations forming alternating areas of pressure-sensitive adhesive and voids to permit heat-sensitive adhesive to pass therethrough when melted so the first and second surfaces of the heat sensitive adhesive layer bond the material portions together when the material portions are in a juxtaposed position and the adhesive layer set is interposed between the material portions;

a first release liner releasably attached to the first pressure-sensitive adhesive layer; and a second release liner releasably attached to the second pressure-sensitive adhesive layer, the first and second release liners sandwiching the adhesive layer set therebetween.

* * * * *

UNITED STATES PATENT AND TRADEMARK OFFICE
CERTIFICATE OF CORRECTION

PATENT NO. : 5,716,687
DATED : February 10, 1998
INVENTOR(S) : James F. Chumbley It is certified that error appears in the above-identified patent and that said Letters Patent is hereby corrected as shown below: On the title page, Item [76], delete the following Inventor:

Please delete Robert L. Harder from [76] as a listed inventor.

Signed and Sealed this

Twenty-second Day of June, 1999

Attest:

Q. TODD DICKINSON

*Attesting Officer*  *Acting Commissioner of Patents and Trademarks*